(12) United States Patent
Higashitani et al.

(10) Patent No.: US 11,348,346 B2
(45) Date of Patent: May 31, 2022

(54) CONTROL APPARATUS

(71) Applicant: DENSO CORPORATION, Kariya (JP)

(72) Inventors: Mitsuharu Higashitani, Kariya (JP); Noriaki Ikemoto, Kariya (JP); Tomomi Hase, Kariya (JP)

(73) Assignee: DENSO CORPORATION, Kariya (JP)

( * ) Notice: Subject to any disclaimer, the term of this patent is extended or adjusted under 35 U.S.C. 154(b) by 116 days.

(21) Appl. No.: 16/729,992

(22) Filed: Dec. 30, 2019

(65) Prior Publication Data

US 2020/0134335 A1    Apr. 30, 2020

Related U.S. Application Data

(63) Continuation of application No. PCT/JP2018/019021, filed on May 17, 2018.

(30) Foreign Application Priority Data

Jun. 30, 2017    (JP) .............................. JP2017-128308

(51) Int. Cl.
  *G06V 20/59*    (2022.01)
  *G05D 1/00*    (2006.01)
  (Continued)

(52) U.S. Cl.
  CPC ......... *G06V 20/593* (2022.01); *G05D 1/0022* (2013.01); *G05D 1/0055* (2013.01); *G08B 21/0205* (2013.01); *G08C 23/04* (2013.01)

(58) Field of Classification Search
  CPC ........... G06K 9/00838; G06K 9/00832; G05D 1/0022; G05D 1/0055; G08B 21/0205; G08C 23/04; B60W 50/12; G08G 1/16
  (Continued)

(56) References Cited

U.S. PATENT DOCUMENTS

2009/0043457 A1\*   2/2009   Shibagaki .......... G07C 9/00309
                                                                          701/49
2013/0311004 A1   11/2013   Okamura et al.
(Continued)

FOREIGN PATENT DOCUMENTS

JP            H10-6809 A        1/1998
JP            H10-25961 A       1/1998
(Continued)

OTHER PUBLICATIONS

Jun. 19, 2018 International Search Report issued in International Patent Application No. PCT/JP2018/019021.

*Primary Examiner* — Muhammad Shafi
(74) *Attorney, Agent, or Firm* — Oliff PLC

(57) ABSTRACT

In a control apparatus for an automated driving vehicle, a receiving unit receives an external start signal that is a signal for starting automated driving in the automated driving vehicle and is transmitted from outside the automated driving vehicle. A control unit performs processes required for automated driving. A person determining unit determines whether a person is present inside a vehicle cabin of the automated driving vehicle. An operating unit is provided inside the vehicle cabin and receives a single or a plurality of operations for starting automated driving in the automated driving vehicle. In response to the person determining unit determining that a person is present inside the vehicle cabin, the control unit does not start automated driving even when the receiving unit receives the external start signal and starts automated driving only when an operation on the operating unit is performed.

7 Claims, 6 Drawing Sheets

(51) Int. Cl.
*G08B 21/02* (2006.01)
*G08C 23/04* (2006.01)

(58) Field of Classification Search
USPC .......................................................... 701/45
See application file for complete search history.

(56) References Cited

U.S. PATENT DOCUMENTS

| | | | | |
|---|---|---|---|---|
| 2013/0332013 | A1* | 12/2013 | Malone .............. | B60H 1/00764 |
| | | | | 701/22 |
| 2015/0310684 | A1* | 10/2015 | Ederle ................ | G07C 9/00309 |
| | | | | 340/5.61 |
| 2016/0249191 | A1* | 8/2016 | Avrahami ............... | H04W 4/12 |
| 2018/0056988 | A1* | 3/2018 | Heil, Jr. ................ | B60W 30/06 |

FOREIGN PATENT DOCUMENTS

| | | | |
|---|---|---|---|
| JP | 2006-306233 | A | 11/2006 |
| JP | 2016-095559 | A | 5/2016 |
| JP | 2016-168883 | A | 9/2016 |
| JP | 2016-215751 | A | 12/2016 |
| KR | 2015-0042383 | * | 4/2015 |
| WO | 2017/093196 | A1 | 6/2017 |

* cited by examiner

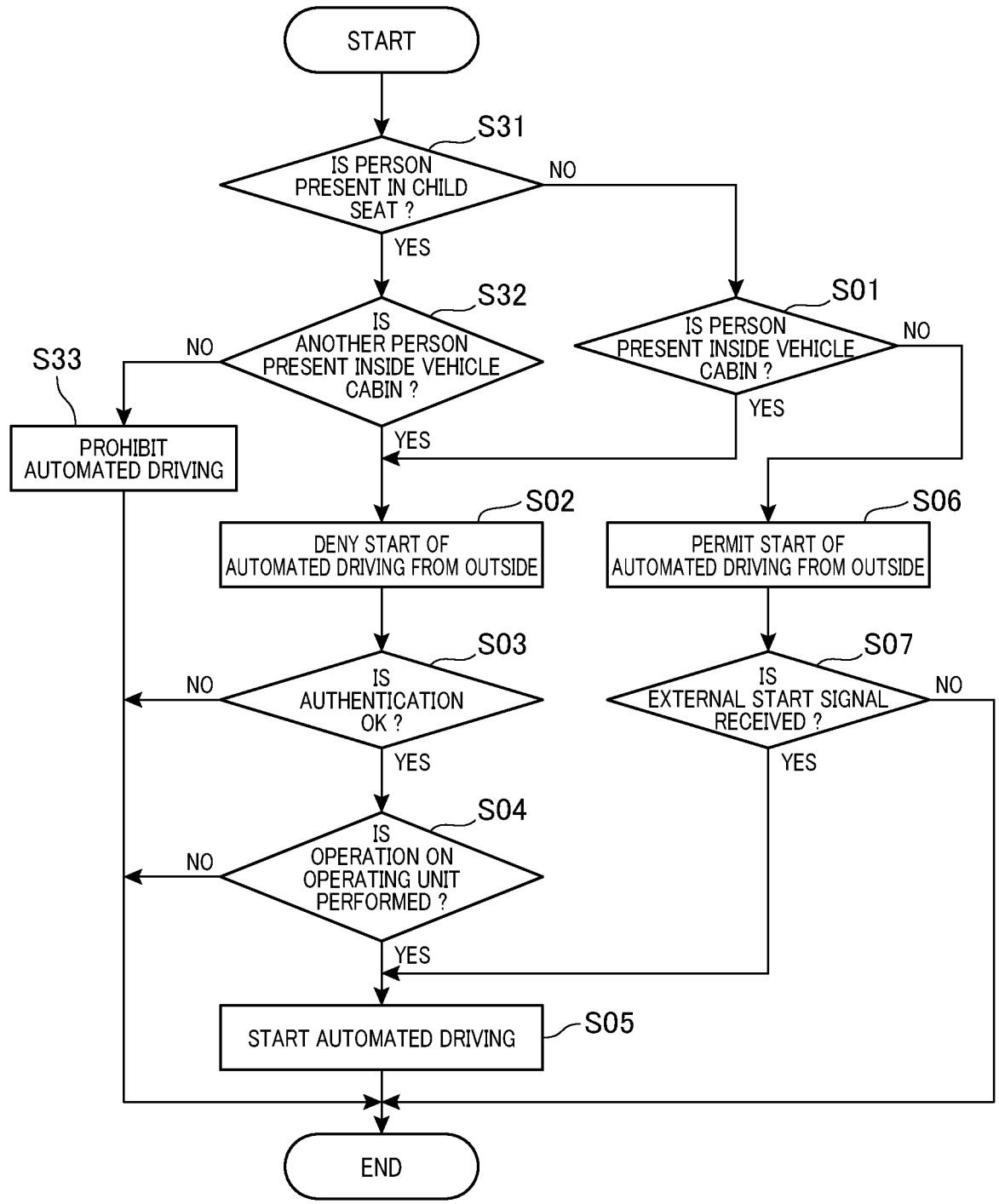

CONTROL APPARATUS

CROSS-REFERENCE TO RELATED APPLICATIONS

The present application is a continuation application of International Application No. PCT/JP2018/019021, filed May 17, 2018, which claims priority to Japanese Patent Application No. 2017-128308, filed Jun. 30, 2017. The contents of these applications are incorporated herein by reference in their entirety.

BACKGROUND

Technical Field

The present disclosure relates to a control apparatus for an automated driving vehicle.

Background Art

Advancements are being made in the development of automated driving vehicles. In addition to automated driving vehicles in which only a portion of driving operations (such as a braking operation) is automatically performed, there are also automated driving vehicles in which all driving operations are automatically performed.

SUMMARY

The present disclosure provides a control apparatus for an automated driving vehicle. The control apparatus receives an external start signal that is a signal for starting automated driving in the automated driving vehicle and is transmitted from outside the automated driving vehicle. The control apparatus performs processes that are required for automated driving. The control apparatus determines whether a person is present inside a vehicle cabin of the automated driving vehicle. When determined that a person is present inside the vehicle cabin, the control apparatus does not start automated driving even when the receiving unit receives the external start signal.

BRIEF DESCRIPTION OF THE DRAWINGS

In the accompanying drawings:

FIG. 6 is a flowchart of processes performed by a control apparatus according to a fifth embodiment.

DESCRIPTION OF THE EMBODIMENTS

Figure 1:
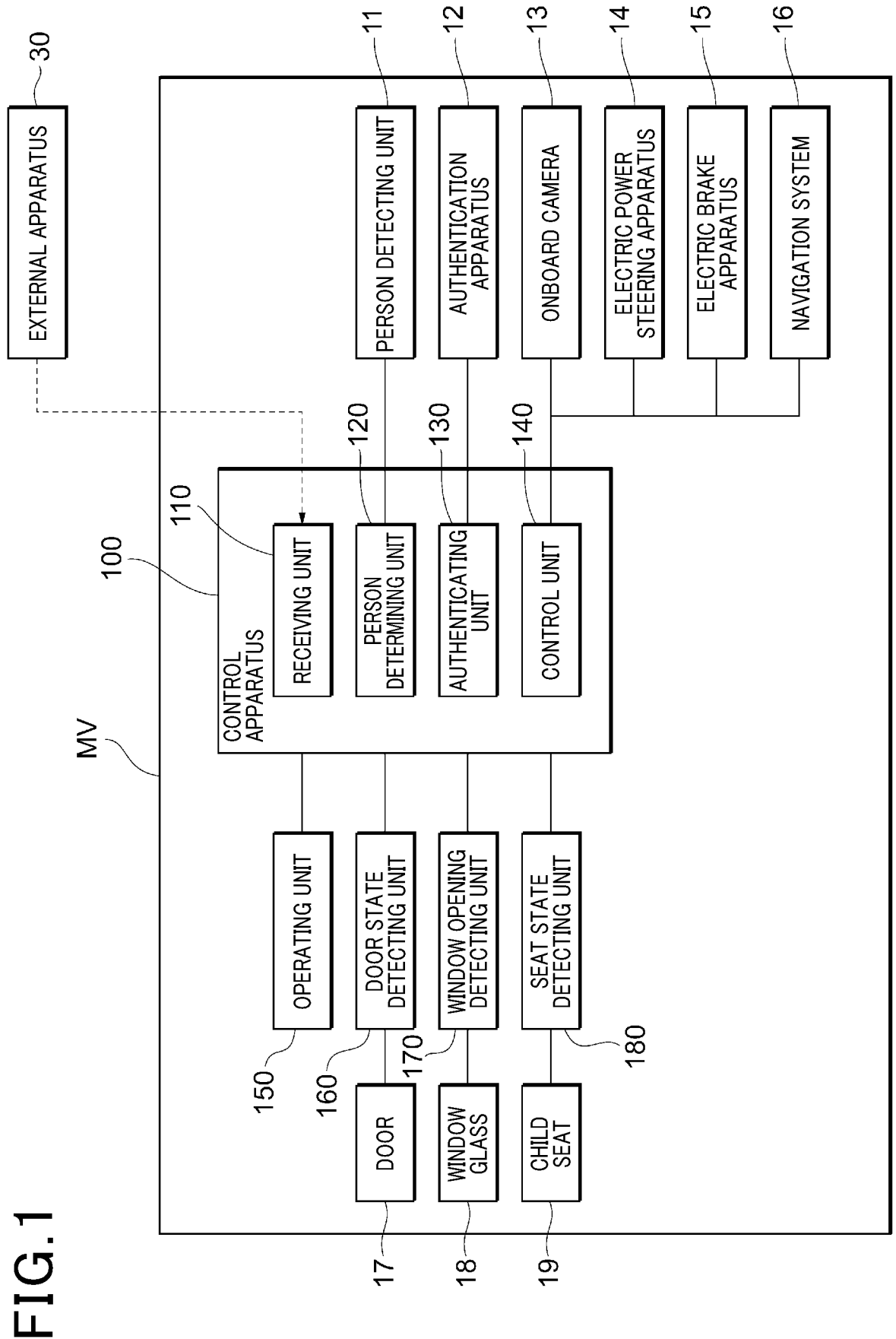
FIG. 1 is a diagram schematically showing an overall configuration of a control apparatus according to a first embodiment and an automated driving vehicle in which the control apparatus is mounted.

In an automated driving processing apparatus described in JP-A-2016-95559, automated driving by an automated driving vehicle can be started based on an operation that is performed by a user on a remote control apparatus.

In the automated driving vehicle in which all driving operations are automatically performed, to ensure safety, it is necessary to prevent automated driving from being started at a timing that is not intended by the user (that is, as a result of an erroneous operation or the like). For example, in the automated driving processing apparatus described in JP-A-2016-95559, automated driving is started only when remote operation to start automated driving is confirmed to be performed by the user who is in a position away from the vehicle. As a result, automated driving being started by an erroneous operation by the user who is holding the remote operation apparatus can be prevented.

However, even when the operation to start automated driving is performed based on the intention by the user, in some cases, starting automated driving at this timing is not appropriate. For example, a case may occur in which, in a state in which an infant is left behind inside a vehicle cabin, the user who does not realize that the child has been left behind performs the operation to start automated driving from outside the vehicle. If the automated driving vehicle is started in such cases, the automated driving vehicle starts with only the infant on board. Such situations are not favorable. This similarly applies to cases in which, instead of an infant, only a dementia patient is present inside the vehicle cabin.

It is thus desired to prevent automated driving from being started in a state in which only an infant or the like is present inside a vehicle cabin.

An exemplary embodiment of the present disclosure provides a control apparatus for an automated driving vehicle. The control apparatus includes a receiving unit, a control unit, and a person determining unit. The receiving unit receives an external start signal that is a signal for starting automated driving in the automated driving vehicle and is transmitted from outside the automated driving vehicle. The control unit performs processes that are required for automated driving. The person determining unit determines whether a person is present inside a vehicle cabin of the automated driving vehicle. In response to the person determining unit determining that a person is present inside the vehicle cabin, the control unit does not start automated driving even when the receiving unit receives the external start signal.

In the control apparatus configured in this manner, automated driving is not started even when the receiving unit receives the external start signal, in response to the person determining unit determining that a person is present inside the vehicle cabin. That is, automated driving is started based on the external start signal only when a person is not present inside the vehicle cabin. Therefore, a situation in which automated driving is started by an operation by a user who is outside the automated driving vehicle in a state in which an infant or the like is inside the vehicle cabin can be reliably prevented.

As a result of the present exemplary embodiment, a control apparatus that is capable of preventing automated driving from being started in a state in which only an infant or the like is present inside a vehicle cabin can be provided.

Embodiments will hereinafter be described with reference to the accompanying drawings. To facilitate understanding of the descriptions, constituent elements that are identical to each other are, given the same reference numbers in the drawings, when possible. Redundant descriptions are omitted.

A control apparatus 100 according to a first embodiment is mounted in an automated driving vehicle MV. The control apparatus 100 is configured as an apparatus that performs control of the automated driving vehicle MV. A configuration of the automated driving vehicle MV will be described with reference to FIG. 1, before a description of the control apparatus 100.

The automated driving vehicle MV is configured as a vehicle that is capable of automatically performing all driving operations (driving, steering, and braking) required for traveling. A user can start automated driving by the automated driving vehicle MV by operating an operating unit 150 that is provided inside a vehicle cabin of the automated driving vehicle MV. In addition, the user can also start automated driving by the automated driving vehicle MV by operating an external apparatus 30 from outside in a state in which the user is not aboard the automated driving vehicle MV. For example, the external apparatus 30 may be a portable communication terminal that is carried by the user. Alternatively, the external apparatus 30 may be a stationary communication terminal that is provided in a home that is inhabited by the user.

The automated driving vehicle MV is provided with a plurality of doors 17 through which the user (that is, a passenger) enters and exits the vehicle cabin. Here, in FIG. 1, the plurality of doors 17 are shown as a single block. Each door 17 is provided with a window glass 18. The window glass 18 is a so-called power window. A degree of opening of the window glass 18 can be changed through electric actuation.

The automated driving vehicle MV is provided with a plurality of seats in which the user sits. However, the plurality of seats are omitted in FIG. 1. A child seat 19 for seating a child is provided in a portion of the seats.

In addition to the foregoing, the automated driving vehicle MV includes a person detecting unit 11, an authentication apparatus 12, an onboard camera 13, an electric power steering apparatus 14, an electric brake apparatus 15, and a navigation system 16.

The person detecting unit 11 is a unit that detects the presence of a person inside the vehicle cabin of the automated driving vehicle MV. According to the present embodiment, a thermosensor is used as the person detecting unit 11. The person detecting unit 11 generates a thermal image of the inside of the vehicle cabin and transmits the thermal image to the control apparatus 100. Here, as the person detecting unit 11, a camera that captures images of the inside of the vehicle cabin through visible light, a weight sensor that detects weight of an object on the seat, or a microphone that detects sounds inside the vehicle cabin may be used.

The authentication apparatus 12 is an apparatus that performs a process to confirm that the user who is aboard the automated driving vehicle MV (that is, a person who is present inside the vehicle cabin) is a specific person (authorized person). That is, the authentication apparatus 12 performs an authentication process. The authentication apparatus 12 according to the present embodiment performs the authentication process by reading information that is written on a Land Transport Bureau license that is owned by the user. Subsequently, the authentication apparatus 12 transmits the result of the authentication process (authentication result) to the control unit 100. Here, as the authentication apparatus 12, an apparatus that performs the authentication process by capturing an image of the face of the user with a camera and analyzing the captured image may be used. In addition, an apparatus that performs the authentication process by communicating with the portable communication terminal owned by the user may be used.

The onboard camera 13 is a camera that is used to capture an image of the periphery, particularly a front side, of the automated driving vehicle MV. For example, the onboard camera 13 is a camera that uses a complementary metal-oxide semiconductor (CMOS) sensor. The onboard camera 13 transmits data of the captured image to the control apparatus 100. The control apparatus 100 analyzes the image and ascertains positions of obstacles and lane markings, and the like in the periphery of the automated driving vehicle MV. As a result, steering and braking to prevent collision with an obstacle, steering to implement traveling along a lane marking, and the like can be automatically performed. Here, image processing such as that described above may be performed by an electronic control unit (ECU) that is provided separately from the control apparatus 100.

The electric power steering apparatus 14 is an apparatus that applies steering force by electric power to a steering shaft. When the automated driving vehicle MV is performing automated driving, the electric power steering apparatus 14 generates the overall steering force that is required for the automated driving vehicle MV to travel along the lane marking without steering operations by the user.

Operations of the electric power steering apparatus 14 are controlled by the control apparatus 100. Here, an aspect in which an ECU that carries out control of the electric power steering apparatus 14 is separately provided is also possible. In this case, the control apparatus 100 controls operation of the electric power steering apparatus 14 by communicating with the ECU.

The electric brake apparatus 15 is an apparatus that generates braking force by electric power and thereby decelerates or stops the automated driving vehicle MV. When the automated driving vehicle MV is performing automated driving, the electric brake apparatus 15 automatically generates braking force without braking operations by the user. Operations of the electric brake apparatus 15 are controlled by the control apparatus 100. Here, an aspect in which an ECU that carries out control of the electric brake apparatus 15 is separately provided is also possible. In this case, the control apparatus 100 controls operation of the electric brake apparatus 15 by communicating with the ECU.

Here, for example, as such an electric brake apparatus 15, a regenerative brake that uses a motor may be used. Alternatively, a hydraulic brake may be used. That is, all that is required is that the electric brake apparatus 15 be an apparatus that generates braking force in the automated driving vehicle MV based on a signal from the control apparatus 100.

The navigation system 16 is a system that identifies a current position in which the automated driving vehicle MV is traveling using a global positioning system (GPS). The navigation system 16 can generate a route on which the automated driving vehicle MV is to travel to reach a destination. The navigation system 16 can then display the route to the user or provide guidance such that the automated driving vehicle MV automatically travels along the route.

The configuration of the control apparatus 100 will be further described with reference to FIG. 1. The control apparatus 100 is configured as a computer system that includes a central processing unit (CPU), a read-only memory (ROM), a random access memory (RAM), and the like. As functional control blocks, the control apparatus 100 includes a receiving unit 110, a person determining unit 120, an authenticating unit 130, and a control unit 140. In addition, as peripheral apparatuses that are connected to a main body portion of the computer system, the control apparatus 100 further includes the operating unit 150, a door state detecting unit 160, a window opening detecting unit 170, and a seat state detecting unit 180.

Here, the control apparatus 100 that is configured as described above may be configured as a single computer system. However, an aspect in which a plurality of computer systems are linked and operated, and the computer systems as a whole function as the control apparatus 100 is also possible. In addition, an aspect in which a portion or the entirety of the control apparatus 100 is set in a position differing from that of the automated driving vehicle MV, and the control apparatus 100 controls automated driving of the automated driving vehicle MV by communicating with the automated driving vehicle MV is also possible.

The receiving unit 110 is configured as a communication interface to the outside. The receiving unit 110 receives an external start signal that is transmitted from the external apparatus 30. An external start signal is a signal for making the automated driving vehicle MV start automated driving. When the user performs the operation to start automated driving on the external apparatus 30, the external apparatus 30 transmits the external start signal. When the receiving unit 110 receives the external start signal, the control apparatus 100 performs a process to make the automated driving vehicle MV start automated driving. Here, in some cases, the control apparatus 100 may not make the automated driving apparatus MV start automated driving even when the receiving unit 110 receives the external start signal. This will be described hereafter.

The person determining unit 120 determines whether a person is present inside the vehicle cabin of the automated driving vehicle MV. The person determining unit 120 determines whether a person is present inside the vehicle cabin based on information that is transmitted from the person detecting unit 11, described above, that is, the thermal image of the inside of the vehicle cabin. Here, an aspect in which the person detecting unit 11 performs processes up to the determination regarding whether a person is present and the person determining unit 120 receives the result of the determination is also possible.

The authenticating unit 130 is a section that confirms that the user who is aboard the automated driving vehicle MV (that is, the person who is present inside the vehicle cabin) is a specific person. The authenticating unit 130 performs the above-described authentication by receiving information transmitted from the authentication apparatus 12, described earlier, that is, the result of the authentication process. Here, the authenticating unit 130 may be configured as a section that performs only reception of the result of the authentication process performed by the authentication apparatus 12. Alternatively, the authenticating unit 130 may be configured as a section that performs the authentication process based on information (such as license information) transmitted from the authentication apparatus 12.

The control unit 140 performs processes required for automated driving. The control unit 140 performs control of driving force, control of the electric power steering apparatus 14 and the electric brake apparatus 15, and the like based on the analysis result of the image acquired by the onboard camera 13, information acquired from the navigation system, and the like. The control unit 140 thereby performs automated driving of the automated driving vehicle MV.

The operating unit 150 is a section that receives an operation by the user. The above-described operation is an operation to make the automated driving vehicle MV start automated driving. The operating unit 150 is provided inside the vehicle cabin. When the user who is inside the vehicle cabin is to start automated driving, the user operates the operating unit 150 instead of the external apparatus 30.

Here, the "operation to make the automated driving vehicle MV start automated driving" refers to an operation in which, when the operation is performed, control related to driving, steering, and braking of the automated driving vehicle MV actually starts. Therefore, for example, an operation to merely set a target value in the navigation system 16 is not included in the above-described operation.

According to the present embodiment, the operating unit 150 is a push-button-type switch. The operating unit 150 may have ten-key buttons through which the user inputs predetermined numbers based on audio guidance. In addition, the operating unit 150 may be a microphone that receives sound generated by the user. In this case, the control apparatus 100 starts automated driving by recognizing the sound inputted to the operating unit 150.

The operating unit 150 may be one of the aspects described above or may be combination of a plurality of aspects. For example, an aspect in which, in a configuration in which the operating unit 150 includes both the push-button-type switch and the microphone that receives sounds, automated driving is only be started when both operations are performed is possible.

In any case, the operation to be performed on the operating unit 150 to start automated driving is preferably an operation that is difficult for an infant, a dementia patient, and the like.

The operating unit 150 is configured such that a person who is outside the automated driving vehicle MV cannot perform at least a portion of the operation. That is, for example, automated driving cannot be started by, in a state in which the user is not aboard the automated driving vehicle MV, the user inserting a hand into a space in the open window glass 18 and performing the operation on the operating unit 150.

For example, as a configuration of such an operating unit 150, a configuration in which the push-button-type switch is set in a position away from the door 17, such as near a center console or under a seat can be given. In addition, a configuration in which the operation on the operating unit 150 is received only when a seatbelt on a seat is worn and the weight sensor in the seat detects weight can be given. Furthermore, a configuration which the microphone that receives sound is a directional microphone and is set so as to be capable of receiving only sound that is generated inside the vehicle cabin can be given.

Here, when a plurality of operations are required as the operation for starting automated driving, an aspect in which only a portion of the plurality of operations is not able to be performed by a person who is outside the automated driving vehicle MV is possible.

The door state detecting unit 160 is a sensor that detects an open-closed state of the door 17 that is provided in the automated driving vehicle MV. The door state detecting unit 160 is arranged so as to be capable of detecting the open-closed state of each door 17. The detected state of each door 17 that is detected by the door state detecting unit 160 is transmitted to the control apparatus 100.

The window opening detecting unit 170 is a sensor that detects a degree of opening of the window glass 18 that is provided in each door 17. The window opening detecting unit 170 is arranged so as to be capable of detecting the degree of opening of each window glass 18. The degree of opening of each window glass 18 that is detected by the window opening detecting unit 170 is transmitted to the control apparatus 100.

The seat state detecting unit 180 is a sensor for detecting the presence of a person in the child seat 19. The seat state detecting unit 180 according to the present embodiment is a weight sensor that is provided in the child seat 19. When an object of a predetermined weight or more is placed in the child seat 19, the seat state detecting unit 180 detects the object as a person (specifically, an infant). The presence or absence of a person that is detected by the seat state detecting unit 180 is transmitted to the control apparatus 100.

The seat state detecting unit 180 that is the weight sensor may be provided in the seat in which the child seat 19 is mounted, instead of being provided in the child seat 19. For example, a mechanism for measuring the weight of an object that is placed in the seat being provided inside a portion of the seat that is an attachment surface for the child seat 19 can be considered. In this case, the seat state detecting unit 180 detects the presence of a person in the child seat 19 based on a value that is obtained by the weight of the child seat 19 being subtracted from the weight measured by the weight sensor. In addition, an aspect in which the seat state detecting unit 180 is configured as a temperature sensor rather than the weight sensor is also possible.

Here, a case in which, in a state in which an infant is left behind inside the vehicle cabin, the user who does not realize this state may perform an operation on the external apparatus 30 from outside the vehicle and start automated driving. In this case, the infant who is unable to respond to changes in circumstances based on their own judgment is left alone inside the vehicle cabin. This is not favorable. This similarly applies to a state in which, instead of an infant, only a dementia patient is present inside the vehicle cabin.

Therefore, in the control apparatus 100 according to the present embodiment, automated driving being started in a state in which only an infant or the like is present inside the vehicle cabin is prevented by a process, described below, being performed.

Figure 2:
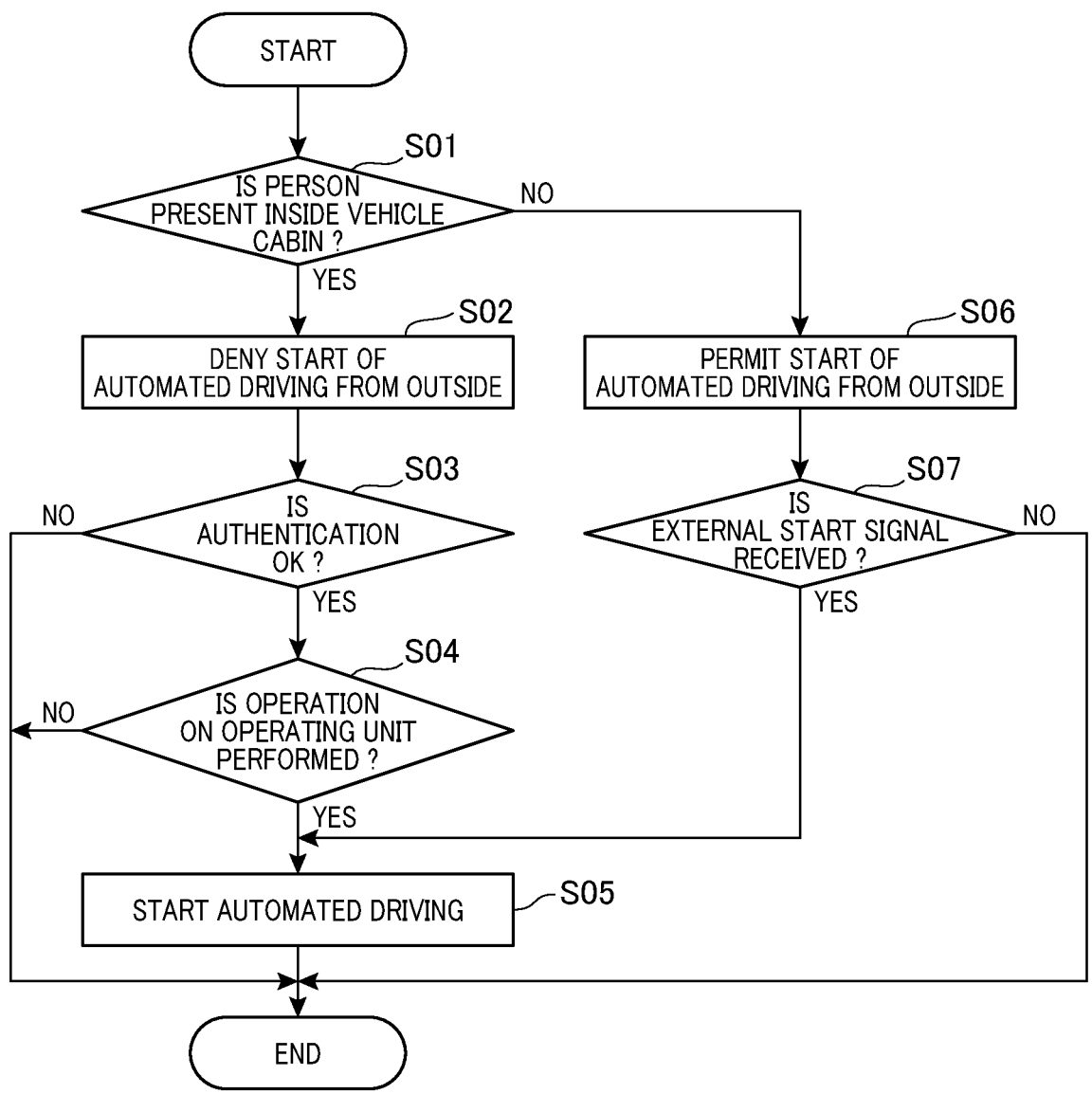
FIG. 2 is a flowchart of processes performed by the control apparatus in FIG. 1.

A series of processes shown in FIG. 2 is repeatedly performed by the control apparatus 100 every time a predetermined control cycle elapses. At an initial step S01 of the process, the control apparatus 100 determines whether a person is present inside the vehicle cabin. The person determining unit 120 performs the determination. When determined that a person is present inside the vehicle cabin (YES at step S01), the control apparatus 100 proceeds to step S02.

At step S02, the control apparatus 100 performs a process to transition to a mode in which the start of automated driving from outside is denied. Subsequently, even when the receiving unit 110 receives the external start signal that is transmitted from the external apparatus 30, the control unit 140 does not start automated driving. Therefore, for the user to start automated driving, the user is required to perform the operation on the operating unit 150 inside the vehicle cabin in a state in which the user is aboard the automated driving vehicle MV.

At step S03, following step S02, the control apparatus 100 performs the authentication process to determine whether the result of the authentication process is OK by the authenticating unit 130. When determined that the result of the authentication process is OK (YES at step S03), that is, when the user aboard the automated driving vehicle MV is recognized as the specific person, the control apparatus 100 proceeds to step S04. When determined that the result of the authentication process is NG (NO at step S03), that is, when the user aboard the automated driving vehicle MV is not recognized as the specific person, the control apparatus 100 ends the series of processes shown in FIG. 2. Here, the control apparatus 100 may proceed from step S02 to step S04 at all times, without going through the process at step S03.

At step S04, the control apparatus 100 determines whether the user has performed the operation on the operating unit 150, that is, the operation to start automated driving. When determined that the operation on the operating unit 150 has not been performed (NO at step S04), the control apparatus 100 ends the series of processes shown in FIG. 2. When determined that the operation on the operating unit 150 has been performed (YES at step S04), the control apparatus 100 proceeds to step 505. At step 505, the control unit 140 performs a process to start automated driving. Hereafter, automated driving by the control unit 140 is performed.

When determined that a person is not present inside the vehicle cabin at step S01 (NO at step S01), the control apparatus 100 proceeds to step S06. At step S06, the control apparatus 100 performs a process to transition to a mode in which the start of automated driving from outside is permitted. Subsequently, the control unit 140 starts automated driving when the receiving unit 110 receives the external start signal that is transmitted from the external apparatus 30.

At step S07 following step S06, the control apparatus 100 determines whether the receiving unit 110 has received the external start signal. When determined that the receiving unit 110 has received the external start signal (YES at step S07), the control apparatus 100 proceeds to step 505. Subsequently, automated driving by the control unit 140 is performed as described above. When determined that the receiving unit 110 has not received the external start signal at step S07 (NO at step S07), the control apparatus 100 ends the series of processes shown in FIG. 2.

As described above, according to the present embodiment, when the person determining unit 120 determines that a person is present inside the vehicle cabin, the control unit 140 does not start automated driving even when the receiving unit 110 receives the external start signal. That is, automated driving is started based on the external start signal from the external apparatus 30 only when a person is not present inside the vehicle cabin. Therefore, a situation in which automated driving is started by an operation by the user who is outside the vehicle in a state in which an infant or the like is present inside the vehicle cabin can be reliably prevented.

In addition, according to the present embodiment, when the person determining unit 120 determines that a person is present inside the vehicle cabin, the control unit 140 starts automated driving only when the operation on the operating unit 150 is performed. Therefore, automated driving is performed only when a person who is capable of performing the operation on the operating unit 150 based on their own judgment (that is, a person who is not an infant, a dementia patient, or the like) is present inside the vehicle cabin. As a result of a configuration such as this, a situation in which automated driving is started by an operation by the user who is outside the vehicle can be prevented even more reliably.

As described above, the operating unit 150 is configured such that a person who is outside the automated driving vehicle MV cannot perform at least a portion of the operation. As a result, the user who is outside the vehicle cabin reaching an arm into the vehicle cabin from the door 17, operating the operating unit 150, and starting automated driving is prevented.

Figure 3:
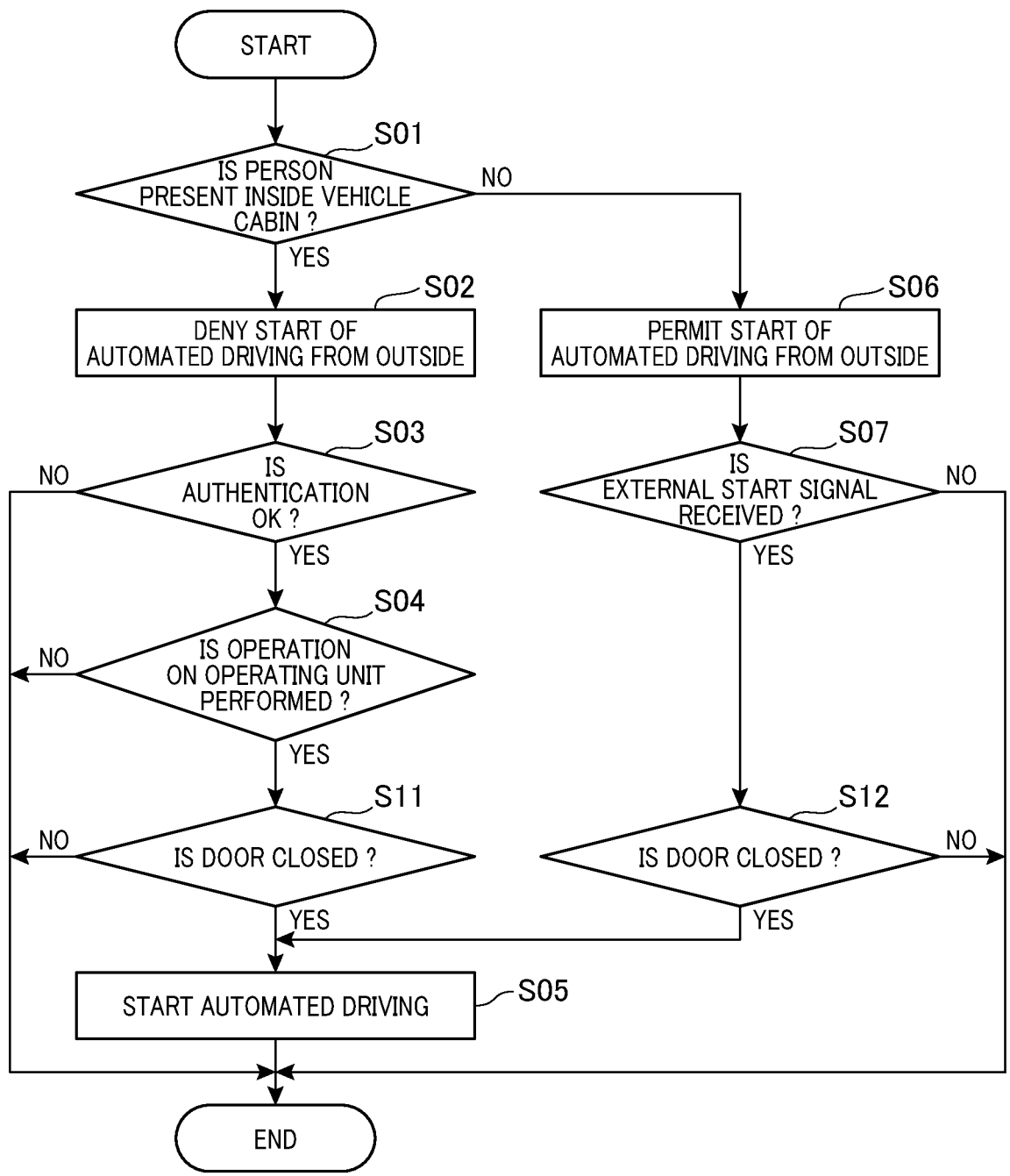
FIG. 3 is a flowchart of processes performed by a control apparatus according to a second embodiment.

A second embodiment will be described with reference to FIG. 3. The present embodiment differs from the first embodiment (FIG. 2) only in terms of the aspect of the process that is performed by the control apparatus 100. Other configurations are identical to those according to the first embodiment. A series of processes shown in FIG. 3 is repeatedly performed by the control apparatus 100 instead of the series of processes shown in FIG. 2. The processes are such that step S11 and step S12 are added to the series of processes shown in FIG. 2. Hereafter, differences with the first embodiment will mainly be described. Descriptions of points that are shared with the first embodiment are omitted as appropriate.

When determined that the operation on the operating unit 150 is performed at step S04 (YES at step S04), the control apparatus 100 proceeds to step S11. At step S11, the control apparatus 100 determines whether the door 17 is in the closed state. The determination is performed based on the detection result from the door state detecting unit 160. When determined that the door 17 is in the closed state (YES at step S11), the control apparatus 100 proceeds to step S05. Meanwhile, when determined that the door 17 is not in the closed state (NO at step S11), that is, the door 17 is in the open state, the control apparatus 100 ends the series of processes shown in FIG. 3 without starting automated driving. In this case, notification that automated driving cannot be started because the door 17 is open may be issued to the user who is inside the vehicle cabin through sound or the like.

When determined that the receiving unit 110 has received the external start signal at step S07 (YES at step S07), the control apparatus 100 proceeds to step S12. At step S12, the control apparatus 100 determines whether the door 17 is in the closed state. The determination is performed based on the detection result from the door state detecting unit. When determined that the door 17 is in the closed state (YES at step S12), the control apparatus 100 proceeds to step S05. Meanwhile, when determined that the door 17 is not in the closed state (NO at step S12), that is, the door 17 is in the open state, the control apparatus 100 ends the series of processes shown in FIG. 3 without starting automated driving.

As described above, according to the present embodiment, when the door state detecting unit 160 detects that the door 17 is in the open state, the control unit 140 does not start automated driving even when the operation on the operating unit 150 is performed. As a result, a user who is outside the vehicle cabin can be more reliably prevented from starting automated driving by reaching an arm into the vehicle cabin from the door 17, operating the operating unit 150.

In addition, according to the present embodiment, even when the external start signal is received in a state in which the user is inside the vehicle cabin, the control unit 140 still does not start automated driving when the door state detecting unit 160 detects that the door 17 is in the open state.

Figure 4:
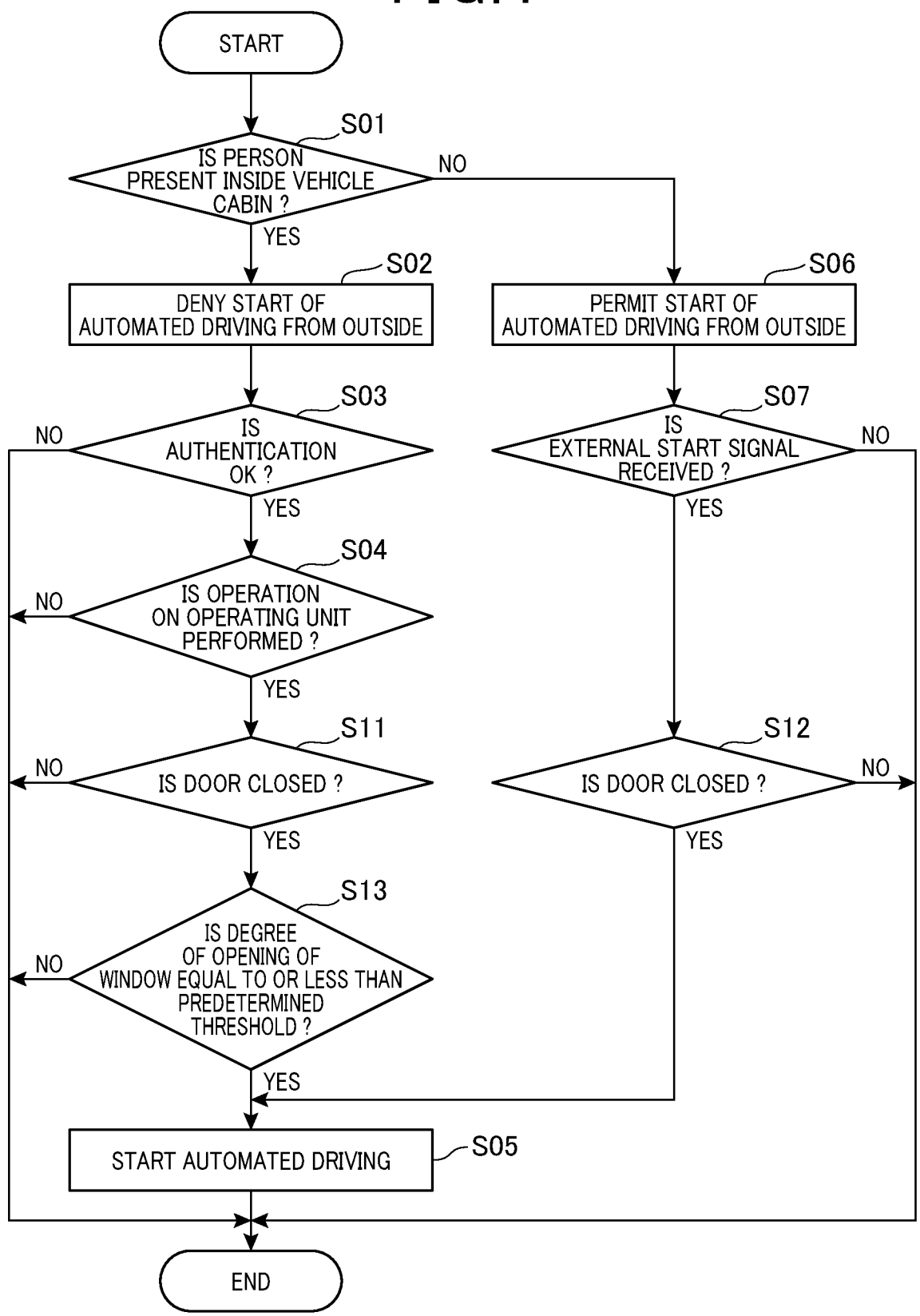
FIG. 4 is a flowchart of processes performed by a control apparatus according to a third embodiment.

A third embodiment will be described with reference to FIG. 4. The present embodiment differs from the second embodiment (FIG. 3) only in terms of the aspect of the process that is performed by the control apparatus 100. Other configurations are identical to those according to the second embodiment. A series of processes shown in FIG. 4 is repeatedly performed by the control apparatus 100 instead of the series of processes shown in FIG. 3. The processes are such that step S13 is added to the series of processes shown in FIG. 3. Hereafter, differences with the second embodiment will mainly be described. Descriptions of points that are shared with the first embodiment are omitted as appropriate.

When determined that the door 17 is in the closed state at step S11 (YES at step S11), the control apparatus 100 proceeds to step S13. At step S13, the control apparatus 100 determines whether the degree of opening of the window glass 18 is equal to or less than a predetermined degree of opening. The determination is performed based on the detection result from the window opening detecting unit 170. When determined that the degree of opening of the window glass 18 is equal to or less than the predetermined degree of opening (YES at step S13), the control apparatus 100 proceeds to step S05. Meanwhile, when determined that the degree of opening of the window glass 18 is greater than the predetermined degree of opening (NO at step S13), that is, the control apparatus 100 ends the series of processes shown in FIG. 4 without starting automated driving.

The above-described "predetermined degree of opening" is a degree of opening that is set in advance as a degree of opening to an extent that the user who is outside the vehicle cabin cannot perform the operation on the operating unit 150 through the space in the window glass 18. Therefore, the predetermined degree of opening is preferably set as appropriate based on the aspect and the position of the operating unit 150. For example, when the microphone that detects sound inside the vehicle cabin is used as the operating unit 150, "fully closed" is set as the predetermined degree of opening such that sound from outside does not reach the microphone inside the vehicle cabin.

Here, the operation that cannot be performed when the degree of opening of the window glass 18 is equal to or less than the predetermined degree of opening may be all operations performed on the operating unit 120. Alternatively, the operation may be only a portion of a plurality of operations that are required to start automated driving. In any case, all that is required is that the user who is outside is not able to start automated driving by operating the operating unit 150 from the space in the window glass 18.

As described above, according to the present embodiment, even when the operation on the operating unit 150 is performed and the door state detecting unit 160 detects that the door 17 is in the closed state, the control unit 140 does not start automated driving when the degree of opening of the window glass 18 detected by the window opening detecting unit 170 is greater than the predetermined degree of opening. As a result, the user who is outside being able to start automated driving by operating the operating unit 150 from the space in the window glass 18 can be reliably prevented.

Figure 5:
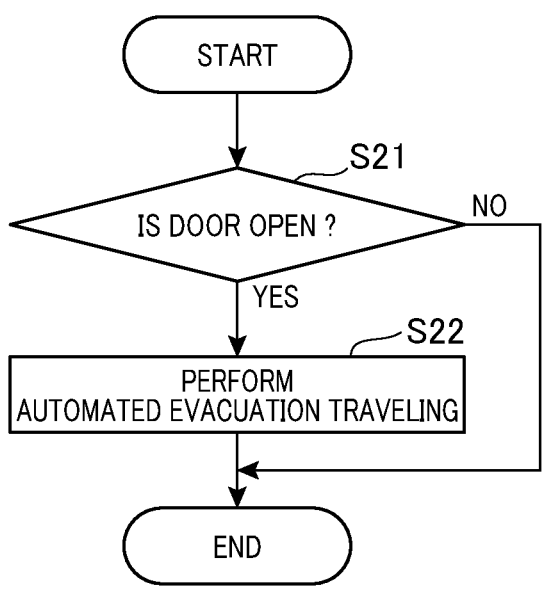
FIG. 5 is a flowchart of processes performed by a control apparatus according to a fourth embodiment.

A fourth embodiment will be described with reference to FIG. 5. The present embodiment differs from the first embodiment (FIG. 2) only in terms of the aspect of the process that is performed by the control apparatus 100. Other configurations are identical to those according to the first embodiment. A series of processes shown in FIG. 5 is repeatedly performed by the control apparatus 100 after at least one operation is performed on the operating unit 150 and automated driving is started, that is, during a period after step S05 in FIG. 2 is started.

At an initial step S21, the control apparatus 100 determines whether the door 17 is in the open state. The determination is performed based on the detection result from the door state detecting unit 160. When determined that the door 17 is not in the open state (NO at step S21), that is, the door 17 is in the closed state, the control apparatus 100 ends the series of processes shown in FIG. 5. Meanwhile, when determined that the door 17 is in the open state (YES at step S21), the control apparatus 100 proceeds to step S22.

At step S22, the control apparatus 100 performs a process for automated evacuation traveling. Automated evacuation traveling is process for making the automated driving vehicle MV that is traveling stop at a safe location. A state in which automated evacuation traveling is performed can be considered to be a state in which automated driving is restricted. Here, when the automated driving vehicle MV is already stopped in the state in which the control apparatus 100 proceeds to step S22, subsequent automated driving is in a restricted state. A state in which the automated driving vehicle MV is stopped is maintained.

As described above, according to the present embodiment, when the door state detecting unit 160 detects that the door 17 is in the open state after the operation on the operating unit 150 has been performed, the control unit 140 restricts automated driving. As a result, for example, in a case in which, after automated driving is started in a state in which an infant and an adult passenger are on board inside the vehicle cabin, only the adult passenger opens the door 17 and leaves the automated driving vehicle MV, a situation in which automated driving is continued in a state in which only the infant is on board can be prevented.

A fifth embodiment will be described with reference to FIG. 6. The present embodiment differs from the first embodiment (FIG. 2) only in terms of the aspect of the process that is performed by the control apparatus 100. Other configurations are identical to those according to the first embodiment. A series of processes shown in FIG. 6 is repeatedly performed by the control apparatus 100 instead of the series of processes shown in FIG. 2. The processes are such that steps S31, S32, and S33 are added to the series of processes shown in FIG. 2. Hereafter, differences with the first embodiment will mainly be described. Descriptions of points that are shared with the first embodiment are omitted as appropriate.

At step S31 that is performed before step S01, the control apparatus 100 determines whether a person is present in the child seat 19. The determination is performed based on the detection result from the seat state detecting unit 180. When determined that a person is not present in the child seat 19 (NO at step S31), the control apparatus 100 proceeds to step S01. When determined that a person is present in the child seat 19 (YES at step S31), the control apparatus 100 proceeds to step S32.

At step S32, the control apparatus 100 determines whether another person is present inside the vehicle cabin, that is, a person other than the person who is seated in the child seat 19 is present inside the vehicle cabin. The determination is performed by the person determining unit 120 based on the detection result from the person detecting unit 11. When determined that another person is present inside the vehicle cabin (YES at step S32), the control apparatus 100 proceeds to step S02. Meanwhile, when determined that another person is not present inside the vehicle cabin, that is, only the infant who is seated in the child seat 19 is present inside the vehicle cabin (NO at step S32), the control apparatus 100 proceeds to step S33. At step S33, subsequent execution of automated driving is in a prohibited state. Then, the control apparatus 100 ends the series of processes shown in FIG. 6.

As described above, according to the present embodiment, when the seat state detecting unit 180 detects that a person is present in the child seat 19 and the person determining unit 120 determines that another person is not present inside the vehicle cabin, the control unit 140 does not start automated driving. Specifically, even in either of the case in which the receiving unit 110 receives the external start signal and the case in which the operation on the operating unit 150 is performed, the control unit 140 does not start automated driving.

According to the present embodiment, as a result of such control being performed, automated driving being started in a state in which only an infant is present inside the vehicle cabin can be prevented with further certainty.

The embodiments are described above with reference to specific examples. However, the present disclosure is not limited to these specific examples. Design modifications in these specific examples made as appropriate by a person skilled in the art are also included in the scope of the present disclosure, as long as the characteristics of the present invention are included. Elements, and arrangements, conditions, shapes, and the like of these elements provided in the above-described specific examples are not limited thereto, and may be modified as appropriate. Combinations of the elements included in the above-described specific examples may be changed as appropriate, as long as technical contradictions do not occur.

What is claimed is:

1. A control apparatus for an automated driving vehicle, the control apparatus comprising:
   a receiving unit configured to receive an external start signal that is a signal for starting automated driving of the automated driving vehicle and is transmitted from outside the automated driving vehicle;
   a control unit configured to perform processes that are required for the automated driving;
   a person determining unit configured to determine whether a person is present inside a vehicle cabin of the automated driving vehicle; and
   an operating unit inside the vehicle cabin that is configured to receive an operation for starting the automated driving;
   wherein:
   the control unit is configured such that, in response to the person determining unit determining that a person is present inside the vehicle cabin, the control unit does not start the automated driving even when the receiving unit receives the external start signal until the operation for starting the automated driving is performed; and
   the operating unit is configured such that the operation cannot be performed by a person outside the automated driving vehicle when a window or a door of the automated driving vehicle is open.

2. The control apparatus according to claim 1, further comprising:
   a door state detecting unit in the automated driving vehicle that is configured to detect an open-closed state of a door of the automated driving vehicle, wherein
   the control unit is configured such that the control unit does not start the automated driving even when the operation on the operating unit is performed when the door state detecting unit detects that the door is in an open state.

3. The control apparatus according to claim 2, further comprising:
a window opening detecting unit in the automated driving vehicle that is configured to detect a degree of opening of a window of the door, wherein
the control unit is configured such that the control unit does not start the automated driving, even when the operation on the operating unit is performed and the door state detecting unit detects that the door is in a closed state, when the degree of opening of the window detected by the window opening detecting unit is greater than a predetermined degree of opening.

4. The control apparatus according to claim 1, wherein:
the control unit is configured to restrict the automated driving when the door state detecting unit detects that the door is in the open state after the operation on the operating unit is performed.

5. The control apparatus according to claim 4, further comprising:
a seat state detecting unit in the automated driving vehicle that is configured to detect a presence of a person in a child seat in the automated driving vehicle, wherein
the control unit is configured such that, in response to the seat state detecting unit detecting that the person is present in the child seat and the person determining unit determines that another person is not present inside the vehicle cabin, the control unit does not start the automated driving even in either of a case in which the receiving unit receives the external start signal and a case in which the operation on the operating unit is performed.

6. The control apparatus according to claim 1, further comprising:
a door state detecting unit in the automated driving vehicle that is configured to detect an open-closed state of a door of automated driving vehicle, wherein
the control unit is configured to restrict the automated driving when the door state detecting unit detects that the door is in an open state after the operation on the operating unit is performed.

7. The control apparatus according to claim 1, further comprising:
a seat state detecting unit in the automated driving vehicle that is configured to detect a presence of a person in a child seat in the automated driving vehicle, wherein
the control unit is configured such that, in response to the seat state detecting unit detecting that the person is present in the child seat and the person determining unit determines that another person is not present inside the vehicle cabin, the control unit does not start the automated driving even in either of a case in which the receiving unit receives the external start signal and a case in which the operation on the operating unit is performed.

* * * * *